Dec. 22, 1970 W. E. BRANDAU ET AL 3,548,662
PRESSURE RATIO MEASUREMENT SYSTEM
Filed Nov. 22, 1968 2 Sheets-Sheet 1
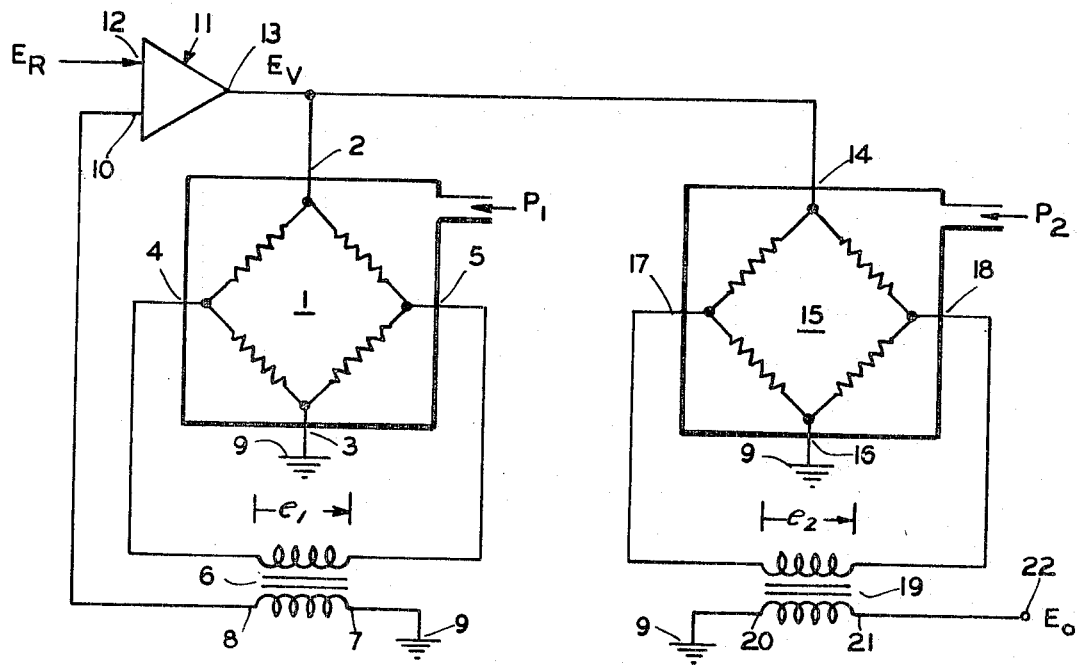
FIG. 1
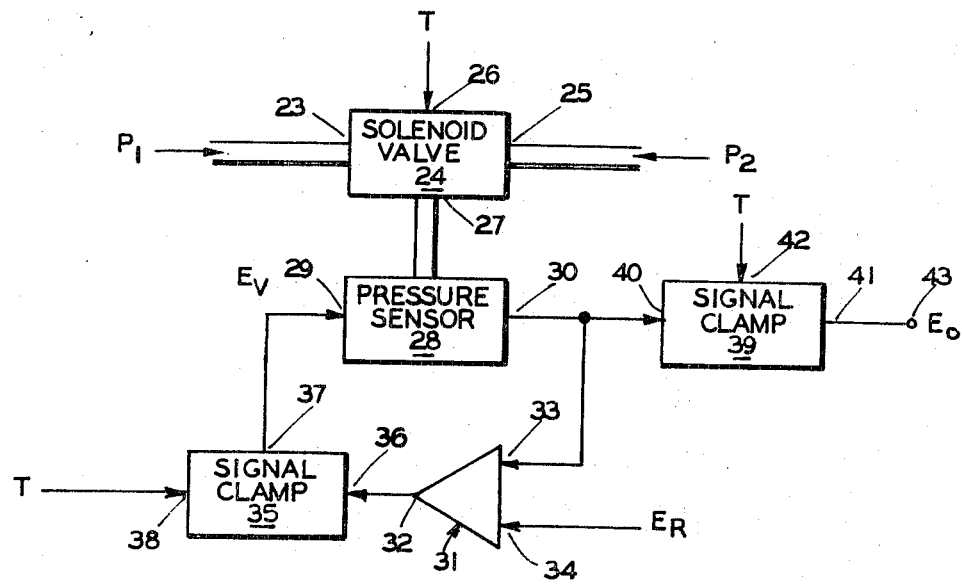
FIG. 2
INVENTORS
WILLIAM E. BRANDAU
ANTHONY E. NAPP
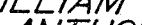
ATTORNEY

United States Patent Office

3,548,662
Patented Dec. 22, 1970

3,548,662
PRESSURE RATIO MEASUREMENT SYSTEM
William E. Brandau, Westwood, and Anthony E. Napp, Woodcliff Lake, N.J., assignors to The Bendix Corporation, a corporation of Delaware
Filed Nov. 22, 1968, Ser. No. 778,188
Int. Cl. G01l 9/04
U.S. Cl. 73—398                9 Claims

ABSTRACT OF THE DISCLOSURE

A pressure ratio measurement device has an operational amplifier having an input receiving a constant reference voltage and an output providing an energizing signal. Pressure sensing means for sensing first and second pressures are energized by the energizing signal and provide first and second electrical outputs corresponding to the energizing signal and the first and second pressures respectively. The first electrical output is connected to the input of the operational amplifier to vary the energizing signal so that the second electrical output corresponds to the ratio of the first and second pressures.

CROSS REFERENCE TO RELATED APPLICATIONS

The embodiment of the invention described herein and shown in FIG. 3 is the subject matter of divisional copending U.S. application Ser. No. 39,818, filed May 22, 1970.

BACKGROUND OF THE INVENTION

Field of the invention

This invention relates to a pressure ratio measurement device and more particularly to such devices using strain gauge pressure sensors.

Description of the prior art

Heretofore strain gauge pressure sensors were not used in devices requiring long time accuracy, such as aircraft altimeters and air speed indicators, because of inherent unstable calibration characteristics caused by temperature, hysteresis and component changes. Strain gauge pressure sensors are well known in the art of pressure measuring and have many outstanding advantages notably small size, fast response, low cost and excellent vibration immunity. But because of the unstable calibration characteristics these advantages have not been realized in systems requiring long time accuracy.

Several methods of sensing and computing pressure ratios have been used in the prior art; however, all of these methods require mechanical devices susceptible to inaccuracies caused by vibration, hysteresis and friction.

The present invention provides an electrical pressure ratio measurement system free of the inaccuracies inherent in a mechanical system and compensates for inherent unstable calibration characteristics of strain gauge pressure sensors thereby making it possible to take advantage of their small size, fast response, low cost and vibration immunity in pressure ratio measurement systems requiring long time accuracy.

SUMMARY OF THE INVENTION

The present invention contemplates a pressure ratio measurement device for providing an output corresponding to the ratio of first and second pressures. Two pressure sensors are excited by a common excitation and provide outputs corresponding to the excitation and the sensed pressure. The output of the sensor sensing the first pressure is maintained at a fixed level by variation of the common excitation; therefore, the excitation is inversely proportional to the first pressure and the output of the sensor sensing the second pressure corresponds to the ratio of the first and second pressures.

If strain gauge pressure sensors are used the invention becomes entirely electrical and is uneffected by the inaccuracies of the prior art; however, the unstable long time calibration characteristics of strain gauge sensors cause inaccuracies. These unstable characteristics can be made self cancelling by the use of a single sensor device.

The invention provides for a device in which a single sensor alternately senses the first and second pressures and alternately provides first and second outputs that are sustained by a clamping means. The first output is maintained constant by variation of the sensor excitation, whereby the excitation inversely corresponds to the first pressure and the second output corresponds to the ratio of the two pressures. Unstable characteristics of the single sensor are reflected in the measurement of both pressures and are cancelled when the ratio is formed.

In order to minimize sensor response errors this device must cycle at approximately one cycle per second. A back pressure may develop at the orifice of a pressure source if the orifice is not large enough to allow sufficient discharge of a high pressure sample from the sensor as it switches from a high to a low pressure.

If orifice restraints appear to be a problem, the invention provides a three sensor device that includes a calibration means. A master pressure sensor senses the first pressure and is effective to establish a common excitation varying as the inverse of the first pressure. A pair of sensors are arranged so that one sensor senses the first pressure and the other sensor senses the second pressure and a pressure switching means periodically switches the pressures between the two sensors. The output of the sensor sensing the second pressure corresponds to the ratio of the first and second pressures. The output of the master pressure sensor is compared with the output of the sensor sensing the first pressure and the excitation thereto is adjusted so that the outputs are equal, whereby the sensors are alternately calibrated with the master sensor.

One object of the invention is to provide a pressure ratio measurement device that is not effected by vibration, hysteresis, friction and temperature.

Another object of the invention is to provide a pressure ratio measurement device using a strain gauge type sensor.

Another object of the invention is to provide a system for continuous compensation of the inherent unstable characteristics of strain gauge pressure sensors.

DESCRIPTION OF THE DRAWINGS

In the drawings, FIG. 1 is a schematic diagram of a pressure ratio measurement device which represents one embodiment of the present invention.

FIG. 2 is a block diagram of another embodiment of the present invention using a single sensor in which sensor errors are self cancelling.

DESCRIPTION OF THE INVENTION

Figure 3:
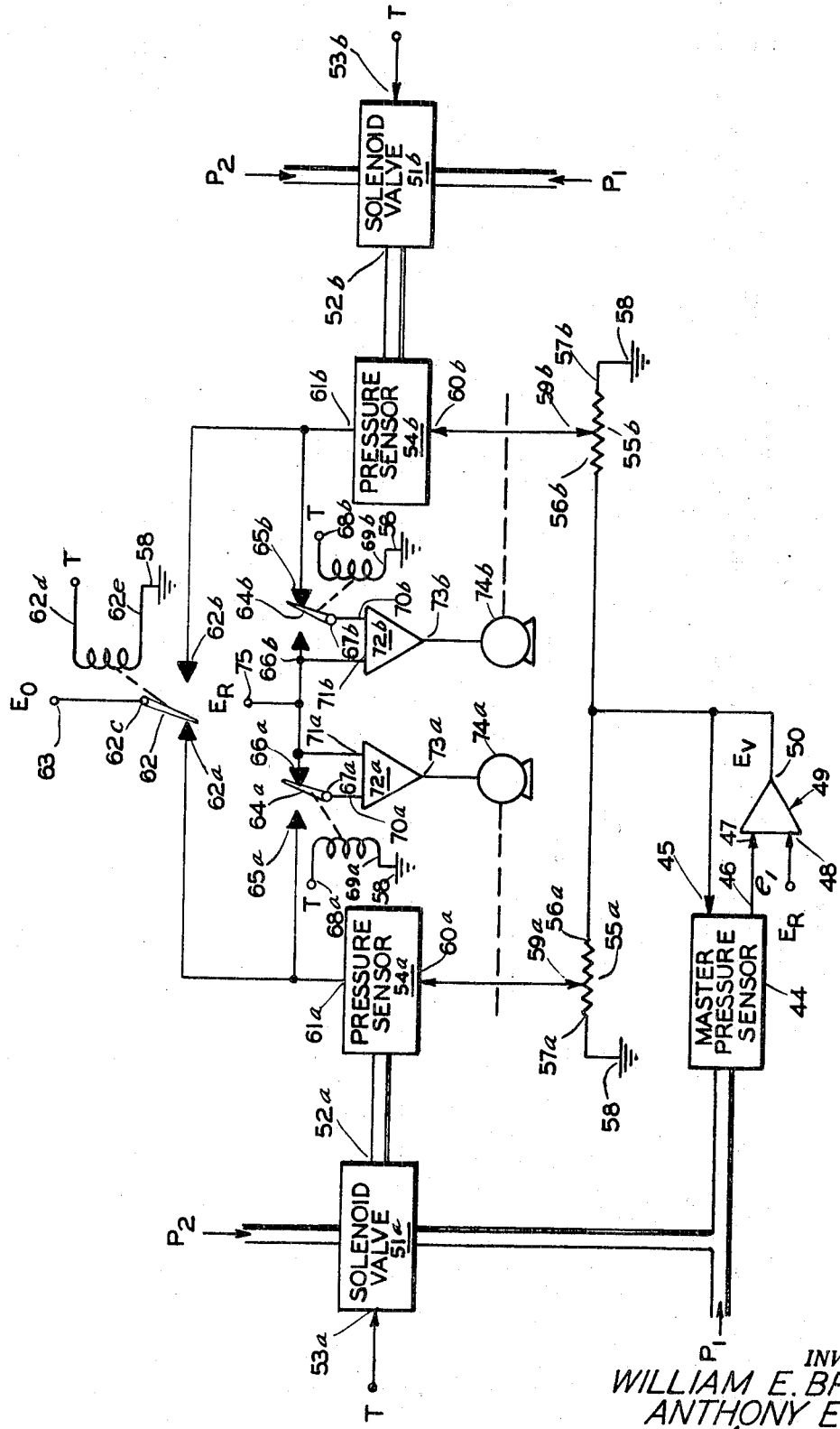
FIG. 3 shows another embodiment of the present invention having provisions for compensating for the inherent unstable calibration characteristics of strain gauge pressure sensors.

Referring to FIG. 1 there is shown a pressure ratio measurement device for providing an output $E_O$ corresponding to the ratio of two pressures. The device has two strain gauge type pressure sensors 1 and 15 of a type that provide an output corresponding to a pressure and voltage applied thereto. An operational amplifier 11 having an output 13 provides a variable excitation voltage $E_V$ to the sensors. Sensors 1 and 15 have input terminals 2 and 14 connected to output 13 for receiving excitation $E_V$ and ground terminals 3 and 16 connected to a ground 9. Sensor 1 has output terminals 4 and 5 connected in parallel with a primary winding of a transformer 6. Sensor 15 has output terminals 17 and 18 connected in parallel with a primary winding of a transformer 19. Transformers 6 and 19 have terminals 7 and 20 respectively connected to ground 9. Transformer 19 has a terminal 21 connected to an output terminal 22. Transformer 6 has a terminal 8 connected to an input 10 of operational amplifier 11. A unity reference voltage $E_R$ is supplied to an input 12 of operational amplifier 11.

A pressure $P_1$ is applied to sensor 1 which provides an output voltage $e_1$ corresponding to pressure $P_1$ and excitation voltage $E_V$. Output voltage $e_1$ is coupled to the secondary winding of transformer 6 and applied to the input 10 of the operational amplifier. Operational amplifier 11 compares voltage $e_1$ with the reference voltage $E_R$ and varies voltage $E_V$ to maintain voltage $e_1$ equal to voltage $E_R$. Thus voltage $E_V$ inversely corresponds to pressure $P_1$.

A pressure $P_2$ is applied to sensor 15 which provides an output voltage $e_2$ corresponding to pressure $P_2$ and excitation voltage $E_V$. Thus output voltage $e_2$ corresponds to the ratio of pressures $P_1$ and $P_2$ since $E_V$ inversely corresponds to pressure $P_1$. Output voltage $e_2$ is coupled to a secondary winding of transformer 19 and appears on output terminal 22 as a voltage $E_O$.

Referring to FIG. 2 there is shown an embodiment of the present invention that may be used in situations where the pneumatic source impedances are not limited by extremely small probe sensing orifices and where pressure slew rates are mild. A pressure $P_1$ is applied to an input port 23 on a three way solenoid valve 24 and a pressure $P_2$ is connected to an input port 25 on the solenoid valve. A timing signal T is applied to a terminal 26 on solenoid valve 24. The solenoid valve, responsive to timing signal T, alternately switches pressures $P_1$ and $P_2$ to an output port 27. A strain gauge pressure sensor 28 having an excitation terminal 29 and an output terminal 30 is connected to output port 27. An operational amplifier 31 has an input 33 connected to sensor terminal 30. A unity reference voltage $E_R$ is applied to an input 34 of amplifier 31. An output 32 of amplifier 31 is connected to an input terminal 36 of a clamp 35 and supplies an excitation voltage $E_V$ to the clamp. Clamp 35 has an output terminal 37 that is connected to excitation terminal 29 of sensor 28. Sensor 28 provides an output voltage corresponding to the pressure and excitation supplied thereto. Output terminal 30 is connected to an input terminal 40 of a clamp 39. The timing signal T is applied to a terminal 38 of clamp 35 and terminal 42 of clamp 39. An output terminal 41 of clamp 39 is connected to an output terminal 43.

When pressure $P_1$ is connected to sensor 28 through solenoid valve 24 the output voltage of sensor 28 is maintained at unity by variation of the excitation voltage $E_V$ from amplifier 31, thus excitation voltage $E_V$ inversely corresponds with pressure $P_1$. When solenoid 24, responsive to signal T, connects pressure $P_2$ to sensor 28, clamp 35, also responsive to signal T, clamps excitation voltage $E_V$ at its present level and sustains the signal while pressure $P_2$ is connected to the sensor. When pressure $P_2$ is connected to sensor 28 the output voltage therefrom corresponds to pressure $P_2$ and excitation voltage $E_V$ therefore, the output voltage corresponds to the ratio of pressures $P_1$ and $P_2$ when pressure $P_2$ is connected to sensor 28. Clamp 39, responsive to timing signal T, passes the output from sensor 28 to output terminal 43, as signal $E_O$. Upon pressure $P_1$ being reconnected to sensor 28, clamp 39, responsive to timing signal T, clamps the output voltage $E_O$ at its present level and sustains the signal while pressure $P_1$ is connected to the sensor.

This single sensor embodiment is a self compensating device. A single sensor is used to measure both pressures and any existing calibration inaccuracies are reflected in both pressure measurements. These inaccuracies are self cancelling when the ratio is determined.

Referring to FIG. 3 there is shown an embodiment of the invention having strain gauge pressure sensors and means for compensating unstable calibration characteristics. A pressure $P_1$ is connected to a master strain gauge pressure sensor 44 having an excitation terminal 45 and an output terminal 46 connected to an input 47 of an operational amplifier 49. A unity reference voltage $E_R$ is supplied to an input 48 of operational amplifier 49. Operational amplifier 49 has an output 50 connected to the excitation terminal 45 for providing a variable excitation voltage $E_V$ to sensor 44. Sensor 44 generates an output voltage $e_1$ corresponding to the excitation voltage $E_V$ and the pressure $P_1$. Operational amplifier 49 varies the excitation voltage $E_V$ to maintain the output voltage $e_1$ at a unity level, thus voltage $E_V$ inversely corresponds to pressure $P_1$.

Pressure $P_1$ and a pressure $P_2$ are connected to a pair of three way solenoid valves 51a and 51b having output ports 52a and 52b and terminals 53a and 53b to which a timing signal T is applied. The valves are responsive to signal T to alternately switch pressures $P_1$ and $P_2$ to the output ports. Valves 51a and 51b are arranged so that when $P_1$ is at one output port $P_2$ will be at the other. Two strain gauge pressure sensors 54a and 54b are connected to output ports 52a and 52b respectively.

A pair of potentiometers 55a and 55b have a pair of terminals 56a and 56b connected to output 50 and a pair of terminals 57a and 57b connected to a ground 58. The two potentiometers have a pair of wipers 59a and 59b connected to a pair of input terminals 60a and 60b of sensors 54a and 54b. Thus the sensors 54a and 54b are connected to the excitation voltage $E_V$ and provide an output voltage corresponding to the voltage and the pressure applied thereto. Sensors 54a and 54b have a pair of output voltage terminals 61a and 61b connected to a pair of terminals 62a and 62b of a relay 62. Relay 62 has a terminal 62c connected to an output terminal 63 and a terminal 62e connected to ground 58. Timing signal T is applied to a terminal 62d of relay 62, the relay being responsive thereto for alternately connecting output terminal 63 to the output voltage terminal of the sensor connected to the pressure $P_2$. Thus voltage $E_O$ corresponding to the ratio of pressures $P_1$ and $P_2$ appears on output terminal 63.

The means for compensating of unstable calibration characteristics is identical for both sensors, therefore only the compensation means for sensor 54a will be described. A relay 64a has a terminal 65a connected to terminal 61a of the sensor 54a and a terminal 66a connected to a terminal 75 providing the unity reference voltage $E_R$. Relay 64a has a terminal 67a connected to an input 70a of a servo amplifier 72a. Terminal 66a of relay 64a is also connected to an input 71a of servo amplifier 72a. Timing signal T is applied to a terminal 68a of relay 64a. A terminal 69a is connected to ground 58. Relay 64a is responsive to the timing signal to alternately connect the input 70a of servo amplifier 72a to the terminal 61a when pressure $P_1$ is connected to sensor 54a and to short input 70a to input 71a when pressure $P_2$ is connected to sensor 54a. Servo amplifier 72a has an output terminal 73a connected to a motor 74a which is responsive to signals therefrom. Motor 74a is driveably connected to wiper 59a of potentiometer 55a. When both sensors 44 and 54a are connected to pressure $P_1$ the output of sensor 54a should be unity. Amplifier 72a senses any difference between the output of sensor 54a and the unity reference voltage and is responsive thereto for exciting motor 74a. Motor 74a moves wiper 59a thereby adjusting the excitation to sensor 54a until output therefrom equals unity. Thus the excitation to sensor 54a is adjusted to exactly compensate for any sensor calibration changes. When pressure $P_2$ is connected to sensor 54a relay 64a shorts inputs 70a and 71a of the servo amplifier thereby disabling motor 74a. Sensor 54b is calibrated in a similar manner by adjusting the excitation when pressure $P_1$ is connected thereto. Thus, while one sensor is calibrated the other sensor is supplying output voltage $E_O$ corresponding to the ratio of pressures $P_1$ and $P_2$.

A device constructed according to the present invention will provide an output corresponding to the ratio of two pressures. The accuracy of the device will be independent of friction, hysteresis, vibration or temperature changes. The inherent unstable calibration characteristics of strain gauge pressure sensors will be continuously compensated.

What is claimed is:

1. A device for providing an output corresponding to the ratio of a first pressure from a first source and a second pressure from a second source, comprising:
   pressure sensing means responsive to an energizing signal and to the first and second pressures for providing a first electrical output corresponding to the first pressure and the energizing signal and a second electrical output corresponding to the second pressure and the energizing signal; and
   means for providing the energizing signal said means having an input connected to a reference signal source and to the first electrical output to vary the energizing signal so that the second electrical output corresponds to the ratio of the first and second pressures.

2. A device as described in claim 1, wherein the energizing signal means varies the energizing signal so that the first electrical output substantially equals the reference signal and the energizing signal inversely corresponds to the first pressure.

3. A device as described in claim 1 in which the energizing means comprises an operational amplifier.

4. A device as described in claim 1 in which the pressure sensing means comprises:
   a first pressure sensor for sensing the first pressure and providing the first output; and
   a second pressure sensor for sensing the second pressure and providing the second output.

5. A device as described in claim 4 in which the first and second pressure sensors each include a strain gauge.

6. A device as described in claim 1 additionally comprising switching means responsive to a timing signal for alternately switching the first and second pressures to the pressure sensing means.

7. A device as described in claim 6 in which the pressure sensing means comprises a single pressure sensor for alternately sensing the first and second pressures applied thereto and alternately providing the first and second outputs.

8. A device as described in claim 7 additionally comprising:
   a first clamping means for clamping and sustaining the first output when the sensor is sensing the second pressure; and
   a second clamping means for clamping and sustaining the second output when the sensor is sensing the first pressure.

9. A device as described in claim 8 in which the single pressure sensor comprises a strain gauge pressure sensor.

References Cited

UNITED STATES PATENTS

| | | | |
|---|---|---|---|
| 2,985,019 | 5/1961 | Colvin | 73—407UX |
| 3,095,735 | 7/1963 | Menzel | 73—147 |
| 3,215,824 | 11/1965 | Alexander et al. | 235—196X |

DONALD O. WOODIEL, Primary Examiner